US012175159B1

(12) United States Patent
Vitt et al.

(10) Patent No.: US 12,175,159 B1
(45) Date of Patent: Dec. 24, 2024

(54) PRIVACY WITH EXTRA-AURAL SPEAKERS

(71) Applicant: Apple Inc., Cupertino, CA (US)

(72) Inventors: Nikolas T. Vitt, Redwood City, CA (US); Jonathan D. Sheaffer, San Jose, CA (US); Neal D. Evans, Sunnyvale, CA (US); Christopher T. Eubank, Mountain View, CA (US); Jae Hwang Lee, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/487,893

(22) Filed: Oct. 16, 2023

Related U.S. Application Data

(63) Continuation of application No. 16/890,953, filed on Jun. 2, 2020, now Pat. No. 11,809,774.

(60) Provisional application No. 62/857,707, filed on Jun. 5, 2019.

(51) Int. Cl.
*G06F 3/16* (2006.01)
*G06F 3/01* (2006.01)
*H04R 3/00* (2006.01)

(52) U.S. Cl.
CPC .............. *G06F 3/165* (2013.01); *G06F 3/017* (2013.01); *H04R 3/00* (2013.01); *H04R 2430/01* (2013.01)

(58) Field of Classification Search
CPC   G06F 3/165; G06F 3/017; H04R 3/00; H04R 2430/01
See application file for complete search history.

(56) References Cited

U.S. PATENT DOCUMENTS

2013/0259247 A1* 10/2013 Kim ..................... H04R 1/1041
381/66
2013/0316679 A1* 11/2013 Miller ..................... H04R 1/08
455/569.1
2019/0268460 A1* 8/2019 Agrawal ............... H04W 4/021

\* cited by examiner

*Primary Examiner* — Joseph Saunders, Jr.
(74) *Attorney, Agent, or Firm* — Aikin & Gallant, LLP

(57) ABSTRACT

A method performed by a processor of a computer system including a headset that is to be worn on a head of a user. The method drives a speaker of the headset with an input audio signal to output sound into an environment. The method determines that the speaker is at least partially covered with a cupped hand. In response to determining that the speaker is at least partially covered with the cupped hand, applying a gain to the input audio signal to reduce an output sound level of the speaker.

19 Claims, 4 Drawing Sheets

PRIVACY WITH EXTRA-AURAL SPEAKERS

CROSS-REFERENCE TO RELATED APPLICATIONS

This application is a continuation of co-pending U.S. patent application Ser. No. 16/890,953, filed Jun. 2, 2020, which claims the benefit of priority of U.S. Provisional Patent Application Ser. No. 62/857,707, filed Jun. 5, 2019, which are hereby incorporated by reference in their entirety.

FIELD

An aspect of the disclosure relates to a computer system for initiating a privacy mode upon a determination that a user of a headset is covering a speaker of the headset.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as a digital audio player, that drives each of the speakers of the devices with an audio signal in order to produce sound (e.g., music). Headphones and earphones provide a convenient method by which the user can individually listen to audio content, without having to broadcast the audio content to others who are nearby.

SUMMARY

An aspect of the disclosure is a method performed by a headset that is worn by a user for activating a privacy mode. The headset is an audio device (e.g., smart glasses) that includes extra-aural speakers that are configured to output user-desired audio content (e.g., music). These speakers, as opposed to earphone speakers project sound into the environment to be heard by the user of the headset. This projection of sound produces a sound field, within which other people (e.g., observers) may be able to hear the sound. This may be an undesirable effect when the audio content is of a private nature (e.g., a phone call with a doctor). To prevent observers from overhearing the sound produced by the speakers, the user of the headset may activate the privacy mode, which causes the headset to reduce sound output of the speakers, and thereby reduce the size of the sound field to only include the user. Thus, the observers who were originally within the sound field can no longer hear (or perceive) the sound.

To activate the privacy mode, the headset determines that a speaker is at least partially covered. For instance, when the user's hand covers the speaker that is being driven with an input audio signal to output sound into the environment, the occlusion effect of the user's hand may cause a perceived sound level of the audio content to increase at a particular range of frequencies (e.g., low frequency content). This sound level may be measured in a microphone signal produced by a microphone that is also covered by the user's cupped hand (or is outside of the user's hand). When the sound level exceeds a threshold level above which is indicative of the speaker and microphone being at least partially covered (e.g., by the user's cupped hand), the headset may activate the privacy mode.

An aspect of the disclosure is to compensate for the occlusion effect caused by the speaker (and a user's ear) being at least partially covered, while the headset is in privacy mode. For instance, the extra-aural speakers may be integrated at different positions in the headset. To provide better audibility, the speakers may be positioned close to an ear. For instance, when the headset is smart glasses, the speakers may be positioned along a temple that rests upon the user's ear. Thus, to activate privacy mode, the user may cover the ear and a speaker that is on the temple. As previously described, this gesture causes the perceived sound level to increase due to the occlusion effect. The headset may compensate for the increase to the perceived sound level by producing a gain value to be applied to the input audio signal, which when used to drive the speaker reduces the output sound level. This reduced output sound level cancels out the effect of occlusion caused by the user's hand. Thus, while privacy mode is active, the headset maintains the perceived sound level from before the speaker and the user's ear was at least partially covered.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions, and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
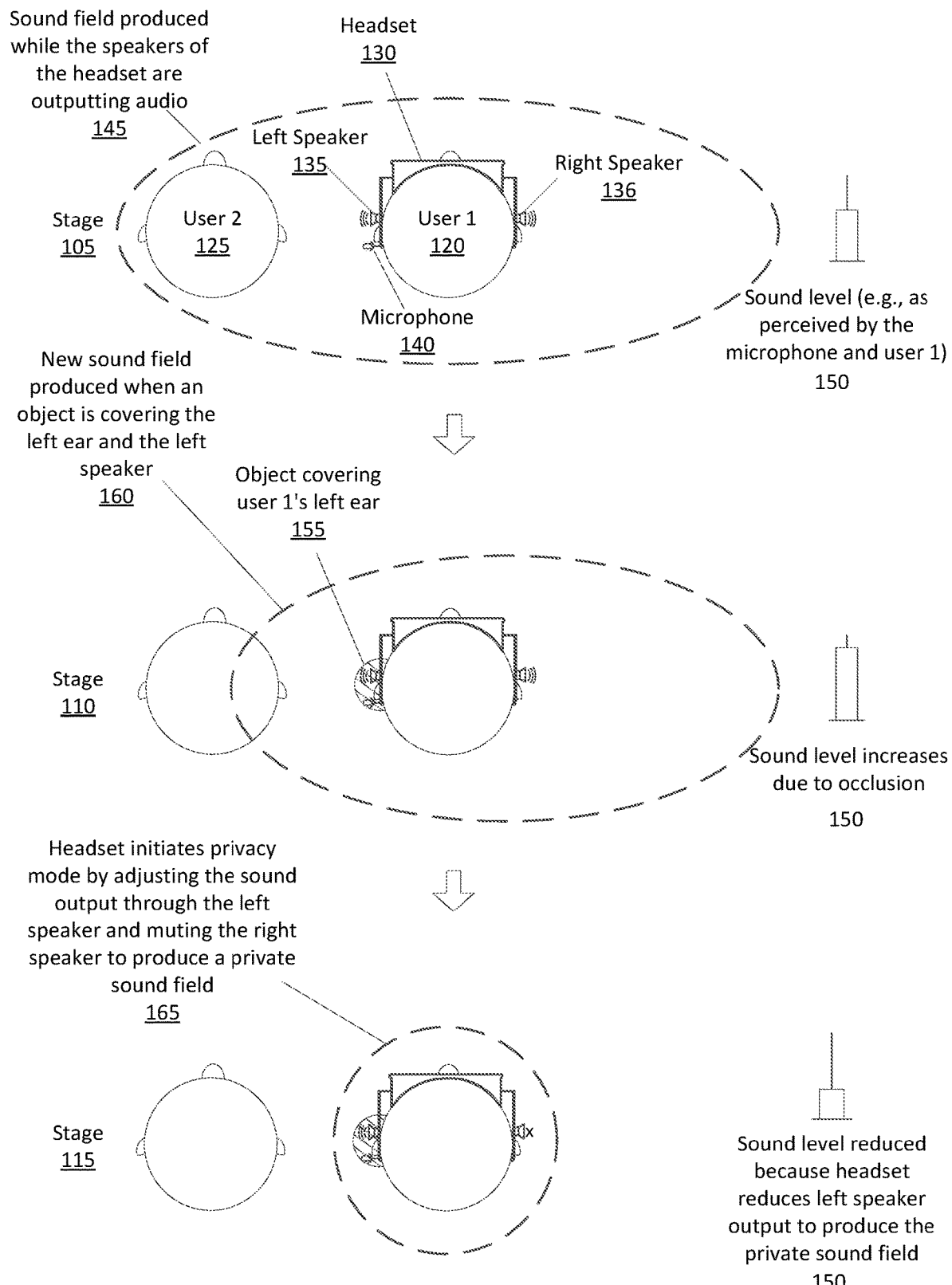
FIG. 1 shows a progression of stages of a user initiating a privacy mode of a headset upon a determination that a speaker of the headset is at least partially covered.

FIG. 1 illustrates a headset 130 (or a head-mounted device "HMD"), which is worn by user 1 120 (e.g., a wearer or a first user), that initiates a privacy mode in response to determining that a left speaker 135 of the headset 130 is being occluded. Specifically, this figure illustrates three stages 105-115 in which the headset 130 reduces a size of a sound field being produced by speakers of the headset 130 in order to prevent user 2 125 (e.g., an observer or a second user) from perceiving the sound output of the speakers.

As used herein, a "headset" may be any head-worn electronic audio device that is designed to output one or more audio signals through at least one speaker integrated therein. In one aspect, the headset 130 may include at least one display screen on which image data (e.g., digital images, video, etc.) may be presented. In other aspects, however, the headset may be an audio electronic device without a display, such as a pair of headphones having two earcups connected together through a bridge that rests on top of the user's head. The earcups may rest on (or over) the user's ears. In another aspect, the headset may be a pair of earphones or ear implants, such as hearing aids, that are designed to be inserted into the ears of the user. As illustrated in this figure, the headset 130 is a pair of smart glasses.

In one aspect, the headset is configured to perform one or more networking and/or audio/image processing operations. In another aspect, the headset is a part of a computer (or audio) system, as disclosed herein, that includes a separate media playback device. For instance, the headset may be a wireless electronic device that is configured to establish a wireless connection with the media playback device (not shown), such as a smart phone, a tablet computer, a laptop, etc., over a wireless computer network, using e.g., BLUETOOTH protocol or a wireless area network. During the established wireless connection, the headset may exchange (e.g., transmit and receive) data packets (e.g., Internet Protocol (IP) packets) with the media playback device. In one aspect, this wireless connection is paring the headset with the media playback device in order to allow the headset to perform at least some operations that may otherwise be performed by the media playback device. For example, the user 120 may participate in a handsfree phone call that is initiated by a smart phone, but conducted through the headset (e.g., using the speakers 135, 136 to output a downlink signal and the microphone 140 to produce an uplink signal). In one aspect, the headset may be communicatively coupled to the media playback device via a wired connection, rather than (or in addition to) a wireless connection. In another aspect, a (e.g., programmed processor of the) paired media playback device may perform at least some of the operations described herein, such as determining whether to initiate a privacy mode (or an improved audibility mode). More about these modes are described herein.

The headset 130 includes a left speaker 135 that is positioned next to a left ear of the user 120 and a right speaker 136 that is positioned next to a right ear of the user 120. Each of the speakers may be an electrodynamic driver that may be specifically designed for sound output at certain frequency bands, such as a subwoofer, tweeter, or midrange driver, for example. In one aspect, either speaker may be a "full-range" (or "full-band") electrodynamic driver that reproduces as much of an audible frequency range as possible. As illustrated, each of the speakers 135, 136 are "extra-aural" speakers that are configured to produce sound into an acoustic environment, rather than being (e.g., earphone) speakers that are configured to be inserted into or placed on top of an ear of a user. In another aspect, at least one of the speakers may be integrated into an "in-ear" or "on-ear" headphone (or the headset 130 may include additional speakers that are configured) to only project sound into the user's ear. In another aspect, the headset 130 may include (or be communicatively coupled) with a pair of open back headphones that allow at least some of the ambient noise from the environment to mix with sound produced by the speakers of the headphones.

The headset 130 also includes a microphone 140 that may be any type of microphone (e.g., a differential pressure gradient micro-electro-mechanical system (MEMS) microphone) that will be used to convert acoustical energy caused by sound waves propagating in an acoustic space (or environment) into an electrical microphone signal. In one aspect, the microphone 140 is an "external" microphone. For example, while the headset 130 is worn by the user 1 120, the microphone is not positioned inside the user's ear, but rather positioned outside the ear of the user, so as to sense sound waves propagating towards (and/or away from) the user. As illustrated in this figure, the microphone 140 and the left speaker 135 are positioned next to the user's left ear. In one aspect, the headset 130 may include more or less speakers/microphones that are positioned at different locations of the headset 130.

In some aspects, the speakers 135 and 136 may form (or be a part of) a speaker array that the headset uses to perform sound output beamforming operations. Specifically, the headset 130 produce driver signals containing audio content to drive the speakers 135 and 136 to produce directional sound beam patterns containing at least some of the audio content. In another aspect, the headset may include two or more microphones that form (or are a part of) a microphone array that the headset uses to perform sound pickup beamforming operations. For example, the headset 130 may use microphone signals produced by the microphones to produce directional beam patterns. More about beamforming operations is described herein.

Returning to FIG. 1, stage 105 illustrates that the headset 130 is playing back (outputting) user desired audio content (e.g., music) through both speakers 135 and 136, thereby producing a (e.g., far) sound field 145. The sound field 145 is an area within which sound energy of audio content produced by the speakers is perceivable by people other than (and including) user 1 120 who are in the area. For example, as shown in this stage user 2 is within the area of the sound field 145 and therefore is able to hear the audio content playing through the speakers 135 and 136. Past the edge of the sound field 145, however, the audio content may not be perceivable. For instance, past the edge of the sound field 145, the sound pressure level of the sound produced by the left speaker 135 (and the right speaker 136) may be near or at 0 dBSPL. As another example, past the edge of the sound field 145, background noise (or ambient sound) of the environment may be acting as an audio mask (e.g., where the background noise has a sound level that exceeds the sound level of audio content). In one aspect, the sound field 145 represents a (e.g., highest) sound energy level of at least one frequency component of the audio content. In some aspects, the frequency component is within a frequency spectrum in which sound is perceivable by humans (e.g., 20 to 20 kHz). In another aspect, the sound field is a function of (e.g., a combination of) each speakers directivity. For instance, the shape of the sound field may be the result of the speakers 135 and 136 producing a beam pattern, as described above. In one aspect, the shape of the sound field may be based on several factors. For instance, each of the speakers may have a different output sound level, causing the sound field to extend out further in one direction than another direction. The different output sound levels may be the result of time delaying audio content in order to control phase interactions between the speakers. In addition, the shape may be based on acoustic objections within the environment, such as walls and furniture.

This stage also illustrates the input sound level 150 (e.g., in dB) perceived by the microphone 140 and user 1 120. Specifically, the sound level 150 is of a microphone signal produced by the microphone 140 that contains (at least some of) the audio content that is playing through speaker(s) 135 and/or 136. In one aspect, the sound level 150 is the same (or similar) as the sound level perceived by user 1 120.

Stage 110 illustrates that the user's left ear, the left speaker 135, and the microphone 140 are being at least partially covered by an object 155. In one aspect, the object 155 may be the user's left hand. For instance, the ear, speaker, and microphone may be at least partially covered by a "cupped hand gesture" (or hand gesture) that is performed by the user 120. The user 120 may perform this gesture by pressing fingers of a hand together and arching the fingers towards the palm of the hand. The user may then press the cupped hand against the left ear, leaving an at least partial closed space between the ear (microphone and/or speaker) and the palm (and/or fingers) of the user's hand. In another aspect, the user's hand may form any gesture, such as being a straight hand gesture (e.g., the fingers parallel with the palm of the hand) or at least slightly straight. In another aspect, the user's cupped hand does not have to touch (or come into contact) with the user's head and may hover over the ear, speaker, and/or microphone. In another aspect, the ear, speaker, and microphone may be covered by any object, such as a hat being worn by the user, or hair of the user. As described herein, the at least partial covering may be an intentional act by the user in order to initiate a privacy mode. In another aspect, the covering may be an unintentional act.

As a result of the covering of the speaker 135, a new (or reduced) sound field 160 is produced, which is smaller than the original sound field 145. The reduced sound field 160 is caused by the object 155 acting as a sound baffle that occludes (some or most) sound energy produced by speaker 135 from passing through the object and into a remainder of the environment. In addition, the object absorbs at least some of the sound energy being produced by speaker 135. Thus, the sound that propagates around the object (e.g., when the object is the user's hand, the sound energy that propagates between a user's fingers or between the palm of the hand and the side of the user's head, etc.) is reduced, thereby causing the original sound field 145 to shrink in size. User 2 125, however, is still at least partially within the new sound field 160 and therefore is still able to perceive at least some sound produced by the headset 130, as illustrated by user 2's right ear being within the sound field 160.

In one aspect, the headset 130 may initiate a privacy mode upon determining that the speaker 135 is at least partially covered in order to reduce the size of the sound field to exclude user 2 125. Specifically, the headset 130 may monitor sensor data, such as a microphone signal produced by microphone 140 to determine whether the speaker 135 is being covered. Continuing with the previous example, when the user's cupped hand covers the user's ear, the speaker, and the microphone, an amount of occlusion may occur. This occlusion, along with baffling sound, may cause an increase or gain in sound energy within the space between the hand and the speaker. Since the microphone is also covered, the sound level 150 of the microphone signal produced by the microphone 140 increases. In one aspect, this increase is to low frequency sound pressure. Upon detecting that the sound level has increased (e.g., above a threshold sound level), the headset 130 may determine that the user is attempting to initiate (or activate) the privacy mode by covering placing a cupped hand over the user's ear. More about how the headset makes this determination is described herein.

Stage 115 illustrates that the headset is initiating the privacy mode in response to the determining that user 1 120 is covering the speaker 135. Specifically, the headset 130 adjusts (or reduces) the sound output of the speakers 135 and 136 in order to produce a private sound field 165 that only includes user 1 120. For instance, the headset may apply a gain to the input audio signal to reduce an output sound level of the speaker 135. The headset 130 also mutes (or ceases to drive) the right speaker 136 (with another input audio signal, such as a right input audio signal of a stereo signal) to further reduce the private sound field 165. In one aspect, the right speaker 136 may be muted while the left speaker 135 is at least partially covered. Thus, while producing the private sound field 165, user 2 125 will not be in the sound field and therefore will not be able to hear the audio content being produced by the headset. More about how the headset may adjust sound output to produce the private sound field is described herein.

The present disclosure allows a user of a headset to initiate a privacy mode in order to prevent others (e.g., user 2 125) from hearing sound produced by at least one of the headset's onboard speakers. For example, user 1 120 may wish to engage in a telephone conversation via the headset (which is paired to a smartphone) that is of a private nature. Since the speakers 135 and 136 output sound into the environment and user 2 is within the sound field 145 (and partially within 160), the conversation may be heard by user 2. Conventionally, if a user wishes to engage in a private telephone conversation, while next to another person, the user may be required to walk away and enter a separate space. Such an action, however, may be impractical if the phone call occurs when user 1 120 cannot find a separate space (e.g., while the user is on a plane or in a movie theater). Thus, the present disclosure allows the user to hear audio content within a private sound field produced by a headset that ensures privacy (e.g., by not allowing others to hear or perceive the audio content).

Figure 2:
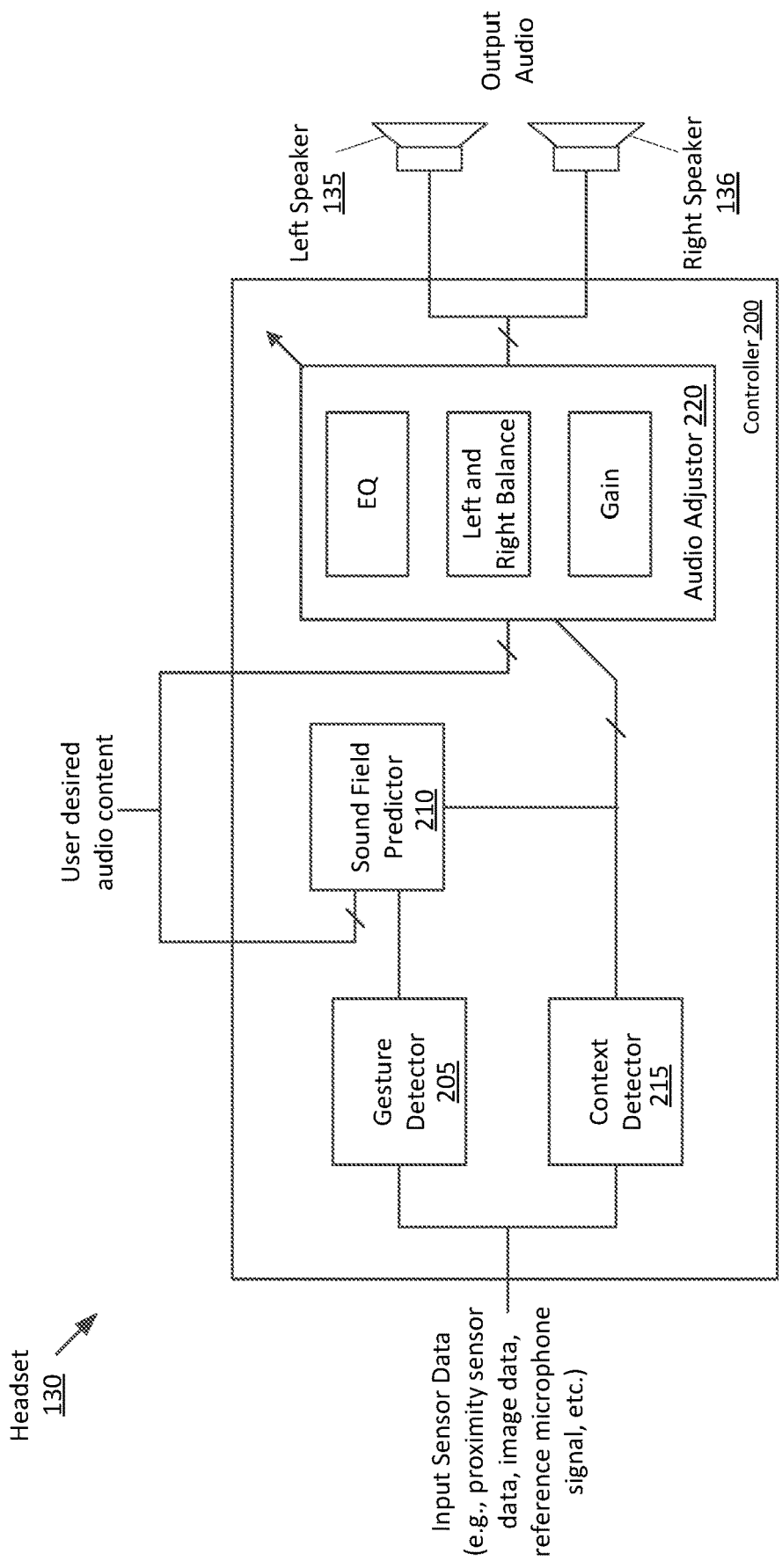
FIG. 2 shows a block diagram of a controller according to one aspect of the disclosure.

FIG. 2 shows a block diagram of a controller 200 of a headset (e.g., headset 130 of FIG. 1), according to one aspect of the disclosure. In one aspect, the controller 200 may be integrated into (e.g., a housing of) the headset 130. The controller 200 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller 200 includes a gesture detector 205, a sound field predictor 210, a context detector 215, and audio adjustor 220. In one aspect, the detectors 205 and 215, the predictor 210, and the adjustor 220 may be implemented in software (e.g., as instructions stored in memory and executed by the controller 200) or may be implemented by hardware logic structures as described above. In another aspect, the detectors and logic may be implemented differently from one another.

The controller 200 is configured to obtain input sensor data and user desired audio content as input audio signal(s) and perform various operations based on the sensor data (and/or the input audio signal(s)) in order to produce output audio signal(s) (e.g., driver signals for driving one or more speakers, such as speakers 135 and 136). In one aspect, the user desired audio may be obtained from a sound source external to the headset 130 (e.g., a media playback device) over a wireless communication link. In one aspect, the controller 200 may retrieve the audio content from local memory. The audio content may be a single audio channel (e.g., mono), or it may include two or more audio channels, such as a left audio channel and a right audio channel that may represent a musical work that has been recorded as two channels. Alternatively, there may be more than two audio channels. In one aspect, the sensor data may be produced by a sensor that is integrated into the headset, such as a proximity sensor, motion sensor (e.g., an accelerometer, a gyroscope, an infrared sensor, etc.), a touch sensor, a camera, a reference microphone (e.g., microphone 140), etc. In one aspect, sensor data may be voltage and/or current values measured from a speaker (e.g., left speaker 135) of the headset. From sensor data obtained from the speaker, the controller 200 may determine different characteristics of the speaker, such as an acoustic impedance value. In one aspect, at least some of the sensors may be integrated into another electronic device that is communicatively coupled with the headset 130. For instance, a proximity sensor may be a part of a wearable device (e.g., a smart watch) that is paired with the headset 130. Sensor data produced by the wearable device may be transmitted, via a wireless communication link, to the headset 130. As another example, the camera may be a part of a media playback device, such as a smartphone, that is paired with the headset 130.

The gesture detector 205 is configured to receive input sensor data from at least one sensor. The detector 205 is configured to determine whether a user of the headset 130 is attempting (or requesting) to initiate a privacy mode based on the received input sensor data. Specifically, as described herein, the detector 205 may determine whether an object is at least partially covering a speaker and/or a microphone based on a change in a sound characteristic of the microphone signal. For example, an increase of an input sound level of the microphone signal above a threshold may be indicative that the user is performing a gesture to at least partially cover the speaker and/or microphone based on the change in the sound characteristic. This increase may indicate that a hand of the user is covering the speaker and the microphone, since sound energy produced by a speaker that is within a confined space may increase due to the occlusion. As another example, a change in spectral content (e.g., low frequency content) above threshold may indicate both elements are occluded. As another example, the gesture detector 205 may determine that the user is performing a particular gesture to initiate the privacy mode based on image data. Specifically, the detector 205 may perform object recognition upon the image data to detect a hand gesture contained within the field of view of the camera.

In one aspect, the detector 205 may use other sensor data to determine that a user is performing a hand gesture. For instance, the detector 205 may monitor proximity sensor data of a proximity sensor that is next to the speaker and/or microphone. As another example, the detector 205 may monitor for changes to acoustic impedance of the speaker. Specifically, the acoustic impedance may increase due to a pressure increase caused by the occlusion effect of a cupped hand covering the speaker. Once the acoustic impedance exceeds a threshold, the detector 205 may determine that the user is performing a cupping hand gesture. In one aspect, the detector 205 may use any combination of sensor data to detect a hand gesture. For example, the detector 205 may monitor proximity sensor data to determine whether an object is within a threshold distance of the headset. Once the object exceeds the threshold distance, the headset may activate another sensor, such as the camera to begin capturing image data to confirm that the user is performing a particular hand gesture.

In another aspect, the gesture detector 205 is configured to determine what type of object is at least partially covering the speaker and/or microphone. For instance, as described herein, the gesture detector 205 may obtain image data and perform object recognition upon the image data to detect a particular object therein.

In one aspect, the gesture detector 205 is configured to determine an amount of occlusion or how well the speaker and microphone are occluded from the outside environment based on the sensor data. Specifically, the amount of occlusion may correspond to the amount of sound energy that doesn't (or does) leak beyond the object and into a remainder of the acoustic environment. For instance, if the object is the user's hand and there is a high amount of occlusion (e.g., above a first threshold), the user's hand may be completely covering the speaker and/or microphone, leaving little space for sound energy to leak into the environment. If, however, the amount is low (e.g., below a second threshold), the user's hand may be open, with at least some of the fingers spread apart from one another, or may be hovering over the speaker and/or microphone. In one aspect, the amount of occlusion is a percentage value (e.g., 10%, 20%, etc.). In one another, the amount of occlusion corresponds or is proportional to the change of the sound characteristic. For instance, if the sound characteristic changes by 50%, the amount of occlusion may be 50%.

In another aspect, the detector 205 may determine the amount of occlusion using any of the sensor data, such as image data that may indicate how an object within the field of view of the camera is covering the speaker and/or microphone. In another aspect, the detector 205 may determine that a hand gesture is covering the speaker and/or microphone upon determining that the amount of occlusion exceeds a threshold. In one aspect, although not illustrated, the gesture detector 205 may also receive the input audio signal(s) to be used to determine whether the speaker is being occluded using voltage and/or current measurements, as described herein. More about the operations performed by the gesture detector 205 is further described herein.

The sound field predictor 210 is configured to predict (estimate or determine) a sound field that is produced according to the amount of occlusion (and/or change to the sound characteristic) determined by the gesture detector 205 and the input audio signal. Specifically, the predictor 210 predicts how the effect of occlusion will affect the sound field that is produced by the speaker while driven by the input audio signal. To do this, the predictor 210 determines how to process the input audio signal, which if used to drive an unoccluded speaker would simulate a sound field that is produced while the speaker is occluded (e.g., sound field 160 of FIG. 1). For example, the predictor 210 may perform a table lookup into a data structure that associates several amounts of occlusion with types of audio signal processing operations upon (e.g., at least one audio frame) of the input audio signal. As an example, from an amount of occlusion, the predictor may identify a gain to be applied to the input audio signal to attenuate the signal. As another example, the data structure may indicate types of filters to be applied to the audio signal. For instance, the predictor 210 may spectrally shape the input audio signal according to the amount of occlusion (e.g., the predictor 210 may apply a low pass filter, since a hand covering the speaker will reflect or absorb high frequency audio content). In another aspect, the predictor 210 may apply other types of filters, such as a high-pass filter, a band-pass filter, etc. The predictor 210 may estimate the sound field produced by driving the (unoccluded) speaker with the adjusted input audio signal according to (e.g., average) sound pressure dissipation within an acoustic environment. For example, the predictor may estimate the distance (e.g., in one or more directions from the headset) at which the sound pressure level of the sound attenuates to a threshold value (e.g., 0 dB, etc.). In one aspect, the predictor may use any known method to determine the distance and/or area of the predicted sound field (e.g., spherical spreading, etc.).

In one aspect, the predictor 210 may determine the predicted sound field based on predefined sound fields (e.g., sound fields tested in a controlled environment). For example, using the processed input audio signal, the predictor 210 may perform a table lookup into a data structure that associates audio signals with corresponding sound fields. In another embodiment, the predictor 210 may use machine learning operations to determine the predicted sound field from the amount of occlusion and the input audio signal. In another aspect, when multiple speakers are producing sound, the predictor 210 may predict the sound field based on the speakers directivity. For instance, as described herein, the speakers may form a speaker array that are producing at least one beam pattern in a particular direction. Upon determining that at least one of the speakers is occluded, the predictor 210 may predict the effect upon the beam pattern based on the amount of occlusion.

In one aspect, the predictor 210 may predict the sound field according to additional factors. For instance, the predictor 210 may use measured room acoustics of the environment to determine the area of the sound field. For instance, the predictor 210 may determine room acoustics by measuring an impulse response by driving a speaker to produce a stimulus (or sine sweep) and using a captured microphone signal to determine the impulse response. In one aspect, the predictor 210 may determine room acoustics through the use of object recognition of image data captured by the camera of the headset. In one aspect, the predictor 210 may use any method to make this determination. With the room acoustics, the predictor 210 may refine the determined sound field based on the amount of occlusion. More about the operations performed by the predictor 210 are described herein.

The context detector 215 is configured to receive input sensor data from at least one sensor. The context detector 215 is configured to determine a context by which the privacy mode is to be initiated. Specifically, the detector 215 is configured to determine a privacy threshold based on at least the sensor data that is to be used to maintain privacy while driving the speakers to output sound. For example, the detector 215 is configured to detect another person within the environment in which the headset 130 is located, and determine the person's physical characteristics with respect to the headset 130, such as location and orientation of the person's head. From these characteristics, the detector 215 may determine the privacy threshold that is area about the headset that does not include the detected person and/or a distance from the headset to a point before the detected person. To illustrate, in FIG. 1 the privacy threshold may be an area about user 1 that extends leftward and with a boundary that stops before the right ear of user 2. Thus, beyond the privacy threshold sound produced by the headset is not to be perceived by the user 2 125. More about the operations performed by the context detector 215 is further described herein.

The audio adjustor 220 is configured to process the (e.g., user desired) audio content upon activation of the privacy mode based on data obtained from the gesture detector 205, the sound field predictor 210, and/or the context detector 215 in order to produce output audio. Specifically, the adjustor 220 processes the audio content based on whether the predicted sound field is outside the privacy threshold. In other words, the adjustor 220 determines whether sound produced by either of the speakers 135 and 136 can be heard by the detected person within the environment. If not, the audio adjust may perform one of several audio processing operations in order to compensate for the occlusion effect caused by the at least partial covering of the speaker and/or microphone. To process the audio signal, the adjustor 220 may produce a gain value to be applied to an input audio signal in order to reduce an output sound level of at least one speaker (e.g., 135), as described in FIG. 1. The adjustor 220 may perform other audio processing operations, such as performing spectral shaping (e.g., equalization) and left and right balance of the input audio signal(s). The processed audio signals are used to drive at least one of the speakers 135 and 136 to produce a private sound field, which is only audible to the wearer of the headset 130. More about how the adjustor 220 processes the input audio signal is described herein.

In one aspect, as described herein, the gesture detector 205 is configured to initiate the privacy mode upon determining that the user of the headset is attempting to activate the mode. Specifically, upon activating the privacy mode, at least some of the operations described with respect to the sound filed predictor 210, the context detector 215, and the audio adjustor 220 may be performed. In another aspect, when the mode is not initiated, the adjustor 220 may not perform any (or some) of the audio signal processing operations upon the input audio signal, as described herein.

Figure 3:
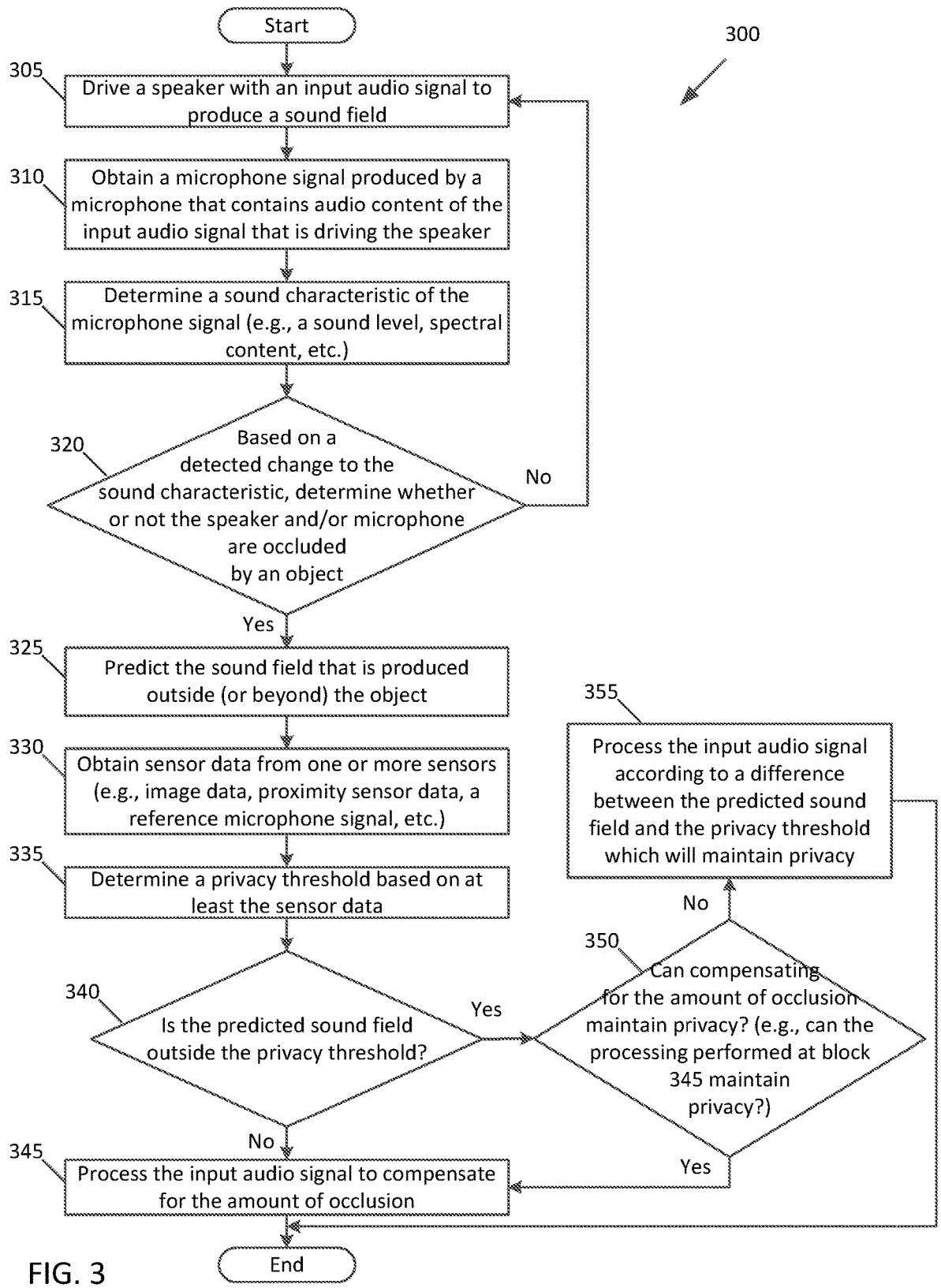
FIG. 3 is a flowchart of one aspect of a process to initiate a privacy mode upon determining that a speaker of a headset is being covered.

FIG. 3 is a flowchart of one aspect of a process 300 to initiate a privacy mode upon determining that at least one speaker (and/or at least one microphone) of a headset is at least partially covered. In one aspect, the speaker and the microphone may be a part of a separate housing (e.g., a pair of headphones) that are communicatively coupled with the headset. In another aspect, the process 300 will be described with reference to FIGS. 1-2. For example, the process 300 may be performed by the controller 200, and more specifically at least one of the gesture detector 205, the sound field predictor 210, the context detector 215, and/or the audio adjustor 220. Process 300 begins by driving a speaker of the headset with an input audio signal to output sound into an environment in which the headset is located (at block 305). For example, the controller 200 may be driving the left speaker 135 (and/or the right speaker 136) of the headset 130 to output user desired audio content of input audio signal(s) to produce the sound field 140. The process 300 obtains a microphone signal produced by a microphone of the headset (e.g., microphone 140) that contains audio content of the input audio signal that is driving the speaker 135 (at block 310). Specifically, the microphone 140 is capturing ambient sound that may include ambient noise from within the environment in which the headset is located and/or sound output of the speaker 135. Thus, in the example illustrated in FIG. 1, the microphone signal may also contain (at least a portion of) audio content of an audio signal that is driving the right speaker 136.

The process determines a sound characteristic of the microphone signal (at block 315). Specifically, as described herein, the sound characteristic may be determined by the gesture detector 205 in order to determine whether the user of the headset is attempting to initiate the privacy mode. For example, the sound characteristic may be a sound level of at least a portion of the microphone signal and/or a portion of the spectral content (e.g., over at least one frequency component, such as a low frequency component) of the microphone signal. In one aspect, the sound characteristic may be the frequency response between the microphone 140 and the left speaker 135 that is indicative of the left speaker 135 being at least partially covered. To determine the frequency response, the controller 200 may drive the speaker 135 with an audio signal that contains a stimulus sound (e.g., an impulse or suitable stimulus such as a sine sweep). The microphone 140 may capture the sound output and measure the impulse response, from which the frequency response may be determined (e.g., converting the impulse response into the frequency domain). In one aspect, the detector 205 may use audio content of the input audio signal to measure the impulse response.

Based on a detected change to the sound characteristic, the process 300 determines whether or not the speaker and the microphone are occluded by an object (at decision block 320). Specifically, the gesture detector 205 may process (e.g., monitor) the microphone signal to detect any changes of the sound characteristic that may be indicative of the speaker and microphone being at least partially covered by an object, such as a user's cupped hand. For example, when the speaker and the microphone are positioned close to the user's ear (such as illustrated in FIG. 1, with the left speaker 135 and the microphone 140 integrated into a left temple of the headset 130, near the left ear), the detector 205 analyzes the microphone signal to determine whether the user is making a cupped hand gesture to at least partially cover the car, the speaker, and the microphone. To make such a determination, the detector 205 may determine whether the sound level of the microphone signal has increased above a threshold level, as described herein. As another example, the detector 205 determine whether there is a change (e.g., increase) in early reflections of an impulse response that is indicative of an object, such as the user's hand covering the speaker and microphone. In one aspect, as described herein, the detector 205 may determine an amount of occlusion caused by the hand covering the speaker and/or microphone based on the change. For example, when the microphone and the speaker are covered by the cupped hand, the sound level may increase due to sound energy being reflected off of the user's hand and back towards the microphone. As another example, the detector 205 may determine that a cupped hand gesture is covering the speaker and microphone based on changes in spectral content of the microphone signal. For instance, when both elements are occluded, spectral content of at least one frequency component may increase, such as low frequency content. Thus, the detector 205 may determine that the user is performing the hand gesture when the spectral content of the microphone signal is above a threshold. If there is not a change to the sound characteristic, the process 300 returns to block 305 to continue to drive the speaker.

If, however, there is a change to the sound characteristic that speaker and the microphone are covered, the process 300 predicts a sound field that is produced outside (or beyond) the object that is at least partially covering the speaker and microphone (at block 325). Specifically, the predictor 210 predicts the sound field produced by sound energy that leaks (or penetrates) through the user's cupped hand according to the occlusion effect (e.g., the change of the sound characteristic). In one aspect, to predict the sound field, the predictor 205 may select a predefined sound field (e.g., determined in a controlled environment) according to the input audio signal and the change of the sound characteristic (or the amount of occlusion). In another aspect, the predicted sound field may be learned through machine learning or through user input.

The process 300 obtains sensor data from one or more sensors, such as image data, proximity sensor data, a reference microphone signal, etc. (at block 330). The process 300 determines a privacy threshold based on at least the sensor data (at block 335). For instance, the context detector 215 determines whether there is an observer (e.g., user 2 125) who is in the environment in which the headset is located. In one aspect, to determine this, the detector 215 may obtain image data captured by a camera and perform object recognition algorithms upon the image data to identify a location and/or orientation of an observer within the field of view of the camera. As another example, the context detector 215 may also use proximity sensor data to detect the distance (and location) of the observer with respect to the headset. As described herein, from this information, the detector 215 may determine a privacy threshold that is an area within which sound energy produced by the headset (and/or that leaks through the cupped hand of the user) is perceivable by a person. In one aspect, the privacy threshold may be set to a distance away from the observer (e.g., at least one meter away) in order to provide a buffer. In one aspect, other objects detected within the environment may be used to determine the privacy threshold, such as a sign (e.g., a sign that reads "Please be Quiet"). In another aspect, the privacy threshold may be based on position data of the headset 130 that indicates the headset 130 is in a public location (e.g., a library). In one aspect, the detector 215 may determine a predefined privacy threshold. In another aspect, the threshold may be defined each time the operations of process 300 are performed.

The process 300 determines whether the predicted sound field is outside the privacy threshold (at decision block 340). Specifically, the audio adjustor 220 determines if sound output that is produced by the speaker will be heard by the observer and the user of the headset. For example, the adjustor 220 may compare the area of the predicted sound field with the area of the privacy threshold. In this example, the predicted sound field is outside the privacy threshold when the area of the sound field expands beyond at least one boundary of the privacy threshold.

If the predicted sound field is not outside (and is therefore inside) the privacy threshold, meaning that the observer from which the privacy threshold was determined will not be able to perceive the sound output while the user's cupped hand is covering the speaker, the process 300 processes the input audio signal to compensate for the amount of occlusion (at block 345). Specifically, the adjustor 220 determines that the user's hand is acting as a baffle that will prevent sound energy produced by the speaker from reaching the observer. In response, the adjustor 220 performs audio processing operations to compensate for the effect of occlusion caused by the user's hand covering the speaker. For example, as previously described, one of the effects of a cupped hand over a speaker is an increase to the perceived sound level of the audio content. In one aspect, the adjustor reduces the output sound level of the speaker in order for the sound level of the microphone signal that contains the audio content produced by the speaker to match the sound level of the microphone signal that was captured by the microphone from before the speaker and the microphone were occluded. Specifically, the adjustor 220 produces a gain based on (or to compensate for) the amount of occlusion (and/or the change to the sound characteristic), and applies the gain to the input audio signal to produce an adjusted input audio signal for driving the speaker. In one aspect, the adjusted input audio signal has a lower output sound level than the unprocessed input audio signal, even though the perceived sound level at the microphone is the same. This is because the occlusion effect of the cupped hand will cause the output sound level of the adjusted input signal to increase. As a result, the user of the headset perceives the sound as if the user's hand was not covering the speaker.

In one aspect, the occlusion effect of the cupped hand may also change (at least a portion of) the spectral content (or timbre) of the sound output of the speaker. The change of timbre may be user-specific, such as based on the size of the user's hand, the way the user is cupping the hand, etc. Thus, in addition to (or in lieu of) applying a gain value to the input audio signal, the audio adjustor 220 may perform equalization operations on (e.g., spectrally shape) the input audio signal in order for the spectral content of the microphone signal captured after the cupped hand is covering the speaker and the microphone to match the spectral content of the microphone signal from before the speaker and microphone were occluded. In one aspect, the adjustor 220 may perform equalization operations by determining how to filter (e.g., low-pass filter, high-pass filter, band-pass filter, etc.) the input audio signal based on the occlusion effect and/or the difference between the microphone signal captured before and after the cupped hand covered the speaker and the microphone. In one aspect, the adjustor 220 may spectrally shape portions of the microphone signal to compensate for the occlusion effect, such as low frequency content.

In one aspect, the adjustor 220 may process the input audio signal in order to maintain the (input) sound level of the microphone signal, while the wearer's hand is covering the speaker and/or microphone. For instance, a gain may be produced which when applied to the input audio signal compensates for the increase of the input sound level (due to the occlusion) by maintaining the input sound level of the microphone signal form before the speaker was at least partially covered. In another aspect, the adjustor 220 may process the input audio signal in order for the sound level to be the same or similar, such as being within a tolerance level (e.g., 3 dB, 6 dB, 9 dB, etc.) of the sound level from before the wearer was covering the speaker/microphone.

Returning to FIG. 3, if the predicted sound field is outside the privacy threshold, meaning that the sound output produced by the speaker may be heard by an observer and the wearer, the process 300 determines whether compensating for the amount of occlusion can maintain privacy (at decision block 350). Specifically, the adjustor 220 determines whether compensation of the change of the sound characteristic may naturally reduce the predicted sound field to be within the confines of the privacy threshold. In one aspect, the adjustor may adjust the predicted sound field according to the audio processing operation that would be performed at block 345. For example, the adjustor may determine a gain value, a filter, etc. to compensate for the amount of occlusion and adjust the predicted sound field according to the operation. In another aspect, these operations may be similar to the operations performed by the predictor in order to predict the sound field at block 325. For example, the controller 200 may adjust the table lookup according to the additional audio processing operations. If the new predicted sound field can maintain privacy, such that the audio processing operations result in a reduced sound field that is within the confines of the privacy threshold, the process 300 returns to block 345 to process the input audio signal.

If, however, compensating for the amount of occlusion will not maintain privacy, the process 300 processes the input audio signal according to a difference between the predicted sound field and the privacy threshold which will maintain privacy (at block 355). Specifically, the adjustor 220 may produce a different gain to apply to the input audio signal to reduce the sound output level of the speaker to be lower than the sound output level when the adjustor 220 is only compensating for the occlusion effect. Thus, in order to maintain privacy, the perceived sound level at the microphone will be lower than the perceived sound level from before the hand was covering the speaker. Similarly, the adjustor may adjust the spectral content differently than at block 345 in order to maintain privacy.

Some aspects perform variations of the process 300 described in FIG. 3. In one variation, the process 300 may be performed while the user's hand is cupping either the speaker or the microphone. Specifically, the gesture detector 205 may determine that either the speaker or the microphone is occluded based on a change to a sound characteristic at block 320. This may result when the speaker and the microphone are at different locations in the headset. For instance in FIG. 1, the left speaker 135 may be positioned close to the user's left ear, while the microphone 140 is positioned more towards the display of the headset. Thus, when the user places a cupped hand over the left ear, only the left speaker and the ear are covered. In one aspect, a change to sound characteristic may be indicative of just the speaker being occluded. For example, a change of the spectral content of the microphone signal may indicate that only the speaker is covered based on a comparison with the audio signal. Specifically, if the spectral content of the microphone signal that is attributable to the sound output of the speaker is reduced (e.g., below a threshold), while spectral content of ambient noise remains relatively the same the detector 205 may determine that the speaker is being covered, but not the microphone. Similarly, if the spectral content attributable to the sound output of the speaker and the ambient noise is reduced, it may be assumed that only the microphone is covered, leaving the speaker exposed in the environment.

In one aspect, the process 300 may be performed while the speaker (e.g., left speaker 135) is the only speaker of the headset producing (or is to produce) sound output. Specifically, upon activation of the privacy mode (and/or upon a determination that the user is attempting to initiate privacy mode), the headset 130 may mute or deactivate other speakers that are outputting sound (as illustrated in FIG. 1) at block 325. In one aspect, the sound output of other speakers, such as right speaker 136, may not be adjusted upon activation of the privacy mode. In another aspect, the sound output of the right speaker 136 may be adjusted (e.g., applying a same or different gain value to the right input audio signal). For instance, in response to determining that the left speaker 135 is at least partially covered, the controller 200 may process the left audio signal to produce a left adjusted audio signal, according to the operations described above. The controller may also process the right audio signal to produce a right adjusted audio signal, where the left audio signal is processed differently than the right audio signal. The difference may be due to the fact that the left speaker is affected by the occlusion of the user's hand, while the right speaker is not occluded. The controller may drive the left speaker 135 with the left adjusted audio signal to output sound and drive the right speaker 136 with the right adjusted audio signal to output sound.

In another aspect, the adjustor 220 may perform left and right balancing operations. For instance, when the operations of process 300 are performed upon the left speaker 135, the sound output level may be reduced to compensate for the effect of occlusion. As a result, the sound level on the left side of the user may be different than at the right side, since both speakers are producing sound output. Thus, the adjustor may balance the left speaker 135 and the right speaker 136 in order to ensure that the sound level experienced by the user is the same on both sides. In one aspect, the sound field predictor 210 may take into account an adjustment of the right input audio signal (that is to be applied), when predicting the sound field at block 325. In another aspect, when multiple speakers are not covered by the cupped hand gesture, each speakers input audio signal may be adjusted differently.

As described thus far, the process 300 is performed upon a determination that an object is at least partially covering one ear (e.g., the left ear) of the user. In one aspect, the operations described herein may be performed both ears (and speaker(s) and/or microphone(s) within a close proximity to the ears) are at least partially covered by at least one object. For example, the user may perform a dual cupped hand gesture, whereby the user is covering a left ear with a left hand and a right ear with a right hand. To illustrate, referring to FIG. 1, user 1 may cover the left speaker 135 and the microphone 140 with a left hand and cover the right speaker 136 and another microphone (not shown) with a right hand in order to initiate a privacy mode. In this variation, the controller may separately perform the process 300 for both the left speaker 135 using a microphone signal from microphone 140 and the right speaker 136 using a microphone signal from the other microphone. As a result, the controller may process their respective audio signals independent from each other. Specifically, at least some of the operations of process 300 may be performed for the left speaker 135 and at least some of the operations of process 300 may be performed (e.g., again) for the right speaker 136.

In one aspect, the audio processing operations performed upon both input audio signals may be different. For example, the controller may produce a left gain value according to the left speaker being at least partially covered and produce a right gain value according to the right speaker being at least partially covered. Both gain values may be different to compensate for different amounts of occlusion which are a result of the user not performing the same cupped hand gesture to cover both speakers. For example, the user's left hand may form a better seal than the user's right hand. Thus, when the gain values are applied, the left speaker 135 may output a left adjusted audio signal to a lower output sound level than the right speaker 136. In one aspect, the controller 200 may produce the different gain values to ensure that the input sound level at both ears is the same. By having the same input sound level across both ears, the controller 200 maintains audio consistency between both speakers. In another aspect, the controller 200 may perform left right balancing operations upon the signals in order to further maintain audio consistency.

As described herein, the controller 200 may include a sound output beamformer that is configured to produce speaker driver signals which when driving two or more speakers produce spatially selective sound output. For instance, with respect to headset 130, driver signals may cause speakers 135 and 136 to produce directional beam patterns of sound towards locations within the physical environment. In one aspect, rather than having one speaker on each side, the headset 130 may include two or more extra-aural speakers on each side of the headset, thereby being able to produce directional beam patterns of sound towards each of the user's ears. In one aspect, upon determining that that at least two speakers are occluded by a hand gesture, the controller may configure the beamformer to produce a directional beam pattern containing the audio content of the input audio signal towards the hand in order to minimize sound energy from leaking around the hand. In another aspect, the directivity of the beam pattern may be based on the reflection path from the hand towards the ear of the wearer.

In another aspect, the controller 200 is configured to spatially render an input audio signal by applying spatial audio filters. For example, the controller 200 may perform binaural rendering in which the controller applies spatial audio filters (e.g., HRTFs) to audio signals to produce binaural signals (e.g., a left audio signal for the left speaker 135 and a right audio signal for the right speaker 136). These binaural signals cause the speakers to produce spatial audio cues to give a user the perception that sounds are being emitted from a particular location within an acoustic space. In one aspect, the filters may be personalized for the user of the headset 130 in order to account for the user's anthropometrics. In one aspect, upon activation of the privacy mode (e.g., in response to determining that the speaker is at least partially covered), the controller 200 may deactivate (or cease) any beamforming and/or binaural rendering (thereby ceasing to apply spatial audio filters) because such operations may be rendered ineffective when adjusting the output sound level of either speaker, for example. Upon a determination that the user has deactivated the privacy mode (e.g., removed the cupped and away from the speaker), the controller 200 may reestablish beamforming and/or binaural rendering.

Figure 4:
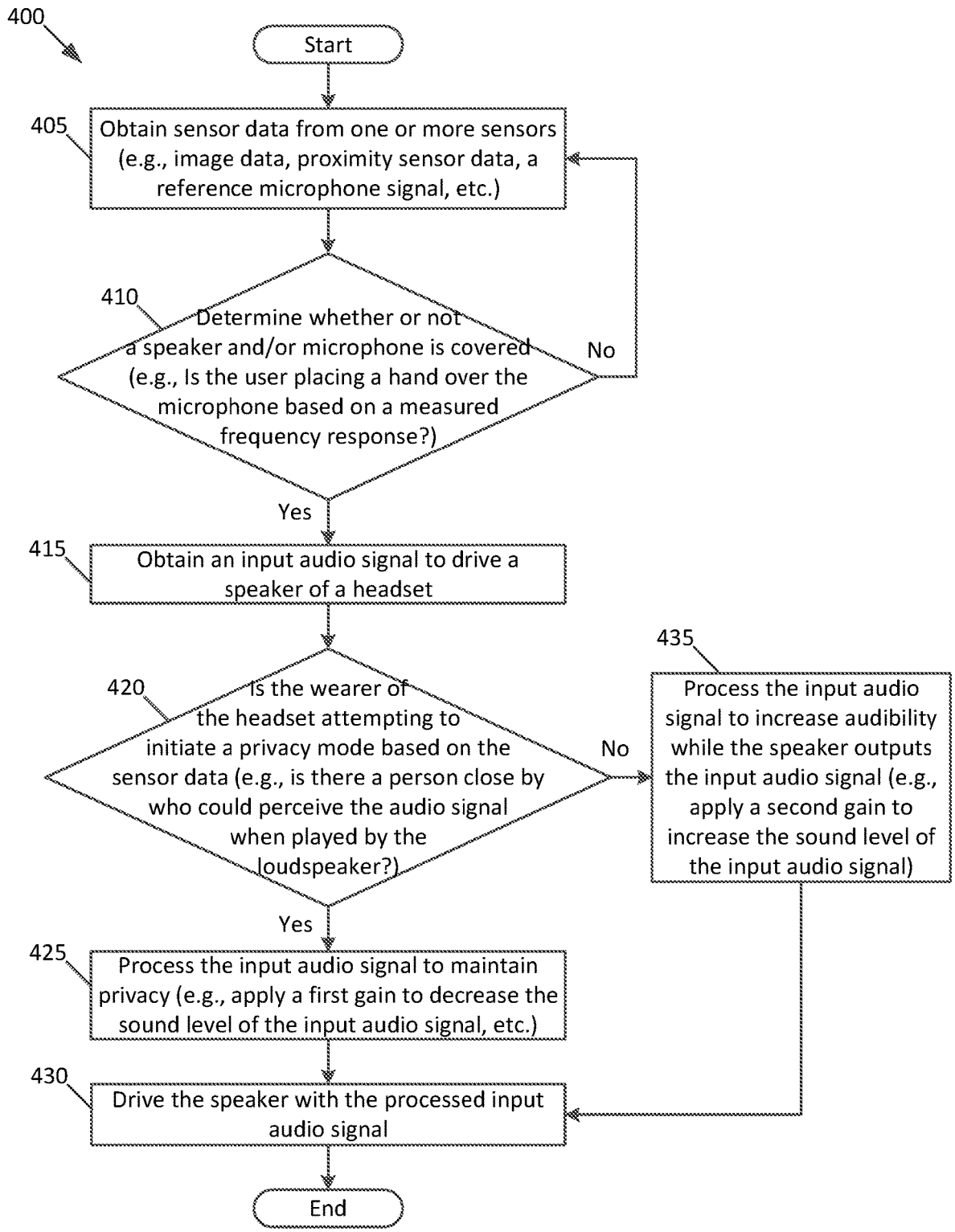
FIG. 4 is a flowchart of one aspect of a process to determine whether to initiate the privacy mode or to initiate an improved audibility mode.

FIG. 4 is a flowchart of one aspect of a process 400 to determine whether to initiate the privacy mode or to initiate an improved audibility mode. In one aspect, as opposed to the privacy mode which may reduce the sound output of a speaker, upon initiation of the improved audibility mode the sound output of the speaker may be increased. In one aspect, similar to the process 300, the operations described herein may be performed by the controller 200. The process 400 begins by obtaining sensor data from one or more sensors (at block 405). In one aspect, the sensor data may include image data, proximity sensor data, a reference microphone signal, etc. The process 400 determines whether or not a speaker (and/or microphone) is at least partially covered by a hand of a user based on the obtained sensor data (at decision block 410). Specifically, the gesture detector 205 determines whether a wearer's hand is at least partially covering either (or both) of the elements, as described herein. For instance, the gesture detector 205 may perform object recognition upon image data captured by a camera that has a field of view of at least the speaker. If the speaker and/or the microphone is not covered, the process 400 returns to block 405.

Otherwise, the process 400 obtains an input audio signal to drive the speaker of the headset (at block 415). The process 400 determines if the wearer of the headset is attempting to initiate a privacy mode based on the sensor data (at decision block 420). Specifically, the context detector 215 processes the sensor data to determine whether privacy mode should be initiated based on at least one of several environmental factors. Thus, the detector 215 is determining the context by which the user of the headset is placing a cupped hand over the speaker and/or microphone. For example, the context detector 215 may determine whether there is anyone within the environment in which the headset is located. To do this, the detector 215 may process image data (according to object recognition) to identify a person within the field of view of the camera. In one aspect, the context detector 215 may determine whether there is anyone in the environment based on proximity sensor data. As another example, the context detector 215 may determine whether an ambient noise level of the environment exceeds a threshold noise level. Specifically, the detector 215 may process a reference microphone signal produced by a microphone that contains ambient noise therein. The detector 215 may then compare the noise level of the ambient noise within the microphone signal to the ambient noise threshold. If a person is within the environment or the ambient noise level does not exceed the threshold noise level, the process 400 determines that the wearer is attempting to initiate the privacy mode, and the process 400 proceeds to process the input audio signal to maintain privacy (at block 425). For instance, the controller may apply a first gain to decrease the sound level of the input audio signal, may spectrally shape the input audio signal, and/or perform left and right balancing operations to ensure that when multiple speakers are producing sound that their perceived sound level is similar. In one aspect, the controller may determine how to process the audio signal based on a location of the person within the environment. For instance, the detector 215 may identify a distance (and orientation) from a location of the person within the environment to the headset using image data and/or proximity sensor data. From the distance, the adjustor 220 may determine a privacy threshold as described herein. The adjuster 220 may use the privacy threshold to determine audio processing operations to be performed upon the input audio signal in order to ensure that the sound energy of the speaker is not audible at that distance.

In another aspect, upon determining that the wearer is attempting to initiate the privacy mode, the process 400 may perform at least some of the operations of process 300 to determine how to process the input audio signal in order to maintain privacy. The process 400 drives the speaker with the processed input audio signal (at block 430).

If, however, there is not a person within the environment or the ambient noise level exceeds the threshold noise level, the process 400 processes the input audio signal to increase audibility while the speaker outputs the input audio signal (at block 435). Specifically, based on the sensor data, the controller 200 determines that the wearer is attempting to initiate an audibility improvement mode. In this mode, the wearer is attempting to amplify the output audio of the speaker in order to improve audibility. For instance, the controller 200 may apply a second gain to increase the sound level of the input audio signal. Once the input audio signal is processed, the signal is used to drive the speaker.

In one aspect, wearable devices that include a microphone array may perform beamforming operations (using beamforming algorithms) to spatially select sound sources within an environment in which the wearable device is located. Such spatial selectivity provides for an improved audio signal that includes sound from a particular sound source, while having less noise and reducing interference from other undesirable sound sources. For example, in the case of smart glasses, the beamforming algorithms may allow a user to focus sound pickup in any direction with respect to the user's position (e.g., in a frontward direction). Similarly, with a speaker array, wearable devices may produce spatially selective sound beam patterns that are directed toward specific locations within the environment.

Some aspects perform variations of the processes 300 and 400 described in FIGS. 3 and 4. For example, the specific operations of these processes may not be performed in the exact order shown and described, and/or specific operations may be omitted entirely.

In one aspect, an audio system that includes a headset, a processor, and memory having instructions stored therein which when executed by the processor cause the audio system to initiate a privacy mode. For instance, the audio system drives a speaker of the headset with an input audio signal to output sound. The audio system determines that the speaker is at least partially covered with a cupped hand. In response to determining that the speaker is covered with the cupped hand, the audio system applies a gain to the input audio signal to reduce an output sound level of the speaker. In one aspect, the speaker may be an extra-aural speaker that is configured to playback sound of the audio signal into the environment. In another aspect, the speaker is a part of a pair of open back headphones that allow at least some ambient noise from the environment to mix with the sound produced by the speaker.

In one aspect, an article of manufacture comprising a machine-readable medium having instructions stored therein that when executed by a processor of a headset having a speaker causes the headset to drive a speaker of the headset with an input audio signal to output sound into an environment, determine that the speaker is at least partially covered, and in response to determining that the speaker is at least partially covered, apply a gain to the input audio signal to reduce an output sound level of the speaker. In another aspect, the instructions of the machine-readable medium to determine that the speaker is at least partially covered comprises instructions to obtain a microphone signal produced by a microphone in the headset, and process the microphone signal to determine a change to a sound characteristic of the microphone signal that is indicative of the speaker being at least partially covered. In some aspects, the sound characteristic is an input sound level of the microphone signal, wherein the change is an increase of the input sound level of the microphone signal above a threshold level. In another aspect, the user is a first user and the machine-readable medium comprises instructions to estimate a sound field that is produced by the speaker while at least partially covered, and determine whether a second user is within the estimated sound field.

In one aspect, the instructions of the machine-readable medium to determine whether the second user is within the sound field comprises instructions to obtain image data from a camera that represents a scene of the environment, perform an object recognition algorithm upon the image data to identify the second user within the scene of the environment, determine a location of the second user with respect to the headset, determine a privacy threshold based on the location of the second user with respect to the headset, and determine whether the sound field is outside or inside the privacy threshold. In another aspect, in response to determining that the sound field is inside the privacy threshold, producing the gain which when applied to the input audio signal compensates for the increase of the input sound level by maintaining the input sound level of the microphone signal from before the speaker was at least partially covered. In some aspects, determining the change to the sound characteristic further comprises determining a change to spectral content of the microphone signal, wherein in response to determining that the sound field is inside the privacy threshold, the machine-readable medium comprises instructions to apply an equalization filter upon the input audio signal to compensate for the change to the spectral content by maintaining the spectral content of the microphone signal from before the speaker was at least partially covered. In another aspect, the instructions to determine that the speaker is at least partially covered may include instructions to determine that the speaker is at least partially covered by a cupped hand according to the change to the sound characteristic.

In one aspect, the machine-readable medium comprises instructions to apply a spatial audio filter upon the input audio signal to produce a spatially rendered audio signal, wherein the speaker is driven by using the spatially rendered audio signal in order to produce binaural sound, wherein in response to determining that the speaker is at least partially covered, comprises ceasing to apply the spatial audio filter upon the audio signal. In another aspect, wherein the input audio signal is a first input audio signal and the speaker is a first speaker, wherein the machine-readable medium comprises instructions to drive a second speaker of the headset with a second input audio signal to output sound into the environment, wherein in response to determining that the speaker is at least partially covered, ceasing to drive the second speaker with the second input audio signal, while the first speaker is at least partially covered.

According to another aspect, an electronic device includes a speaker, a processor, and a memory having stored therein instructions that when executed by the processor causes the electronic device to perform one or more operations as previously described.

According to another aspect, an electronic device comprises a left speaker and a right speaker, a processor, and a memory having stored therein instructions that when executed by the processor causes the electronic device to obtain a left audio signal and a right audio signal, determine that the left speaker is at least partially covered, in response to determining that the left speaker is at least partially covered, process the left audio signal and the right audio signal to produce a left adjusted audio signal and a right adjusted audio signal, wherein the left audio signal is processed differently than the right audio signal, and drive the left speaker with the left adjusted audio signal to output sound and driving the right speaker with the right adjusted audio signal to output sound. In one aspect, the memory comprises instructions to, before determining that the left speaker is at least partially covered, drive the left speaker with the left audio signal to output sound, wherein the instructions to determine that the left speaker is at least partially covered comprises instructions to obtain a microphone signal captured by a microphone of the electronic device that contains sound of the left audio signal, and determine, using the microphone signal, a frequency response between the microphone and the left speaker that is indicative of the left speaker being at least partially covered. In some aspects, the memory comprises instructions to determine an amount of occlusion caused by at least partial covering of the left speaker based on the frequency response, wherein the instructions to process the left audio signal comprises instructions to produce a gain to compensate for the amount of occlusion, and apply the gain to the left audio signal to produce the left adjusted audio signal. In another aspect, the gain compensates for the amount of occlusion by reducing an output sound level of the left adjusted audio signal in order to maintain a sound level of the microphone signal from before determining that the left speaker is at least partially covered. In one aspect, the instructions to process the left audio signal further comprises instructions to determine an equalization filter to compensate for the amount of occlusion, and spectrally shape the left audio signal to produce the left adjusted audio signal according to the equalization filter in order to maintain spectral content of the microphone signal from before determining that the left speaker is at least partially covered.

In one aspect, the memory of the electronic device comprises instructions to determine an amount of occlusion caused by the at least partial covering of the left speaker and the left ear of the user, determine a sound field to be produced by the left speaker and the right speaker while being driven by the left audio signal and the right audio signal according to the amount of occlusion, determine a privacy threshold that represents a distance from the electronic device that sound outputted by the left and right speakers is only perceived by the user, and determine whether the privacy threshold exceeds the sound field, wherein in response to determining that the privacy threshold exceeds the sound field processing the left audio signal comprises instructions to compensate for the amount of occlusion by producing the left adjusted audio signal which when used to drive the left speaker while covered has a perceived sound level that is similar to a perceived sound level of the left audio signal when used to drive the left speaker while not covered. In another aspect, the memory comprises instructions to determine that the right speaker of the electronic device is at least partially covered, wherein the instructions to process the left audio signal and the right audio signal are independent from each other. In some aspects, the instructions to process the left audio signal and the right audio signal comprises instructions to produce a left gain signal according to the left speaker and the left ear of the user being at least partially covered and producing a right, different, gain signal according to the right speaker and the right ear being at least partially covered, and apply the left gain signal to the left audio signal to produce the left adjusted audio signal, which when used to drive the left speaker causes the left speaker to output the sound of the left adjusted audio signal at a first sound level and applying the right gain signal to the right audio signal to produce the right adjusted audio signal, which when used to drive the right speaker causes the right speaker to output the sound of the right adjusted audio signal at a second, different, sound level, wherein, while driving the left speaker with the left adjusted audio signal and driving the right speaker with the right adjusted audio signal, an input sound level of the sound of both signals at each of the left and right ears of the user is the same.

According to another aspect, an electronic device comprises a speaker, a processor, and a memory having stored therein instructions that when executed by the processor causes the electronic device to obtain an audio signal to drive a speaker, determine that the speaker is at least partially covered, and process sensor data to determine whether a person is within an environment in which the headset is located or whether an ambient noise level of the environment exceeds a threshold noise level, wherein if the person is within the environment or the ambient noise level does not exceed the threshold noise level, apply a first gain to the audio signal to decrease a sound level of the audio signal, wherein if the person is not within the environment or the ambient noise level exceeds the threshold noise level, apply a second gain to the audio signal to increase the sound level of the audio signal. In another aspect, the memory comprises instructions to obtain the sensor data from one or more sensors, wherein the instructions to determine that the speaker is at least partially covered is based on the sensor data. In some aspects, the sensor data comprises at least one of image data, proximity sensor data, and a reference microphone signal. In one aspect, the instructions to process sensor data to determine whether the person is within the environment in which the headset is located comprises instructions to perform an object recognition algorithm upon the image data to identify whether the person is within the scene of the environment, and in response to identifying the person determine a privacy threshold that does not include the person, and produce the first gain according to the privacy threshold.

An aspect of the disclosure may be a non-transitory machine-readable medium (such as microelectronic memory) having stored thereon instructions, which program one or more data processing components (generically referred to here as a "processor") to perform the network operations, signal processing operations, and audio/image processing operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by at least one processor of a wearable device, the method comprising:
    driving an extra-aural speaker with an input audio signal to output sound into an environment;
    receiving sensor data from at least one sensor of the wearable device, while the wearable device is worn by a user;
    determining that the user is performing a gesture based at least in part on the sensor data; and
    responsive to determining that the user is performing the gesture,
        determining that the wearable device is to operate in a privacy mode when a person other than the user is within the environment or an ambient noise level of the environment is less than a threshold noise level, or
        determining that the wearable device is to operate in an increased audibility mode when no person other than the user is within the environment or the ambient noise level of the environment is greater than the threshold noise level
        determining a gain based on the wearable device operating in the privacy mode or the increased audibility mode and audio data from a microphone; and
        applying the gain to the input audio signal.

2. The method of claim 1, wherein the at least one sensor comprises at least one of a camera, a proximity sensor, and a reference microphone.

3. The method of claim 1, wherein the gesture comprises a hand gesture performed by the user.

4. The method of claim 1, wherein determining the gain comprises:
    determining a first gain responsive to determining that the wearable device is to operate in the privacy mode; and
    determining a second gain responsive to determining that the wearable device is to operate in the increased audibility mode,
    wherein applying the gain comprises producing an adjusted audio signal by applying the first gain or the second gain to the input audio signal, which when used to drive the extra-aural speaker outputs the sound at a different sound output level than if the other gain is applied to the input audio signal.

5. The method of claim 4, wherein the first gain is to cause the sound to output at a first sound output level and the second gain is to cause the sound to output at a second sound output level that is greater than the first sound output level.

6. The method of claim 1, wherein the at least one sensor comprises a camera that produces image data of the environment, wherein the method further comprises:
    identifying the person other than the user by performing an object recognition algorithm upon the image data;
    determining
    that the person is within the environment when the person is within a threshold distance of the wearable device; and
    determining that the person is not within the environment when the person is not within the threshold distance of the wearable device.

7. The method of claim 1 further comprising:
    producing a spatially rendered audio signal by applying a spatial audio filter upon the input audio signal; and
    driving the extra-aural speaker using the spatially rendered audio signal,
    responsive to determining that the user is performing the gesture, ceasing to apply the spatial audio filter upon the input audio signal.

8. A method comprising:
    receiving sensor data from at least one sensor of a wearable device, while the wearable device is worn by a user;
    determining, using a microphone of the wearable device, an ambient noise level of ambient noise of an environment of the user;
    responsive to determining that the user is performing a gesture based at least in part on the sensor data from the at least one sensor, determining whether the ambient noise level of the ambient noise exceeds a threshold level;
    responsive to determining that the ambient noise level is less than the threshold level, playing back audio content through one or more speakers of the wearable device at a first sound level; and
    responsive to determining that the ambient noise level is greater than the threshold level, playing back the audio content through the one or more speakers of the wearable device at a second sound level that is greater than the first sound level.

9. The method of claim 8, wherein the at least one sensor comprises at least one of a camera, a proximity sensor, and a reference microphone.

10. The method of claim 8 further comprising:
responsive to determining that the user is performing the gesture based at least in part on the sensor data from the at least one sensor, determining whether a person other than the user is within a threshold distance of the wearable device based at least in part on the sensor data;
responsive to determining that the person other than the user is within the threshold distance, playing back the audio content through the one or more speakers at the first sound level; and
responsive to determining that the person other than the user is outside of the threshold distance, playing back the audio content through the one or more speakers at the second sound level.

11. The method of claim 10, wherein the at least one sensor comprises a camera or a proximity sensor.

12. The method of claim 8 further comprises:
playing back a spatial rendering of the audio content through the one or more speakers; and
responsive to determining that the user is performing the gesture based at least in part on the sensor data from the at least one sensor, ceasing to play back the spatial rendering of the audio content through the one or more speakers.

13. The method of claim 8, wherein the wearable device comprises a pair of open back headphones such that sound perceived by the user during playback of the audio content through the one or more speakers includes a mix of the audio content and the ambient noise from the environment of the user.

14. A wearable device, comprising:
a speaker;
at least one sensor;
at least one processor; and
memory having instructions stored therein which when executed by the at least one processor causes the wearable device to:
drive the speaker with an audio signal to output sound into an environment,
receive sensor data from the at least one sensor,
determine that a user of the wearable device is performing a gesture based at least in part on the sensor data,
responsive to a determination that the user of the wearable device is performing the gesture,
determine that the wearable device is to operate in a privacy mode when a person other than the user is within the environment or an ambient noise level of the environment is less than a threshold noise level, or
determine that the wearable device is to operate in an increased audibility mode when no person other than the user is within the environment or the ambient noise level of the environment is greater than the threshold noise level, and
adjust the audio signal based on which of the privacy mode or the increased audibility mode the wearable device is to operate.

15. The wearable device of claim 14, wherein the at least one sensor comprises a camera, a proximity sensor, and a reference microphone.

16. The wearable device of claim 15,
wherein the determining that the user of the wearable device is performing the gesture is based on proximity sensor data produced by the proximity sensor,
wherein the memory has further instructions to determine whether the person other than the user is within the environment based on image data produced by the camera that is processed according to an object recognition algorithm.

17. The wearable device of claim 15, wherein the memory has further instructions to:
produce a spatially rendered audio signal by applying a spatial audio filter upon the audio signal;
drive the speaker using the spatially rendered audio signal; and
responsive to determining that the user is performing the gesture, cease to apply the spatial audio filter upon the audio signal while continuing to drive the speaker using the audio signal.

18. The wearable device of claim 14, wherein the instructions to adjust the audio signal comprises instructions to:
responsive to the wearable device operating in the privacy mode, produce a first gain-adjusted audio signal, which when used to drive the speaker outputs the sound at a first sound output level; and
responsive to the wearable device operating in the increased audibility mode, produce a second gain-adjusted audio signal, which when used to drive the speaker outputs the sound at a second sound output level that is higher than the first sound output level.

19. The wearable device of claim 14 comprises a pair of open back headphones such that sound perceived by the user includes a mix of sound output of the speaker and ambient noise from the environment that passes through the pair of open back headphones.

* * * * *